(12) United States Patent   (10) Patent No.: US 8,740,478 B2
Weberpals                   (45) Date of Patent:    Jun. 3, 2014

(54) OPTICAL MODULE WITH BARE FIBER CLAMP

(75) Inventor: Frank Weberpals, Regenstauf (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 202 days.

(21) Appl. No.: 13/349,664

(22) Filed: Jan. 13, 2012

(65) Prior Publication Data

US 2013/0183011 A1    Jul. 18, 2013

(51) Int. Cl.
    *G02B 6/36*    (2006.01)
(52) U.S. Cl.
    USPC .......................................................... 385/94
(58) Field of Classification Search
    None
    See application file for complete search history.

(56) References Cited

U.S. PATENT DOCUMENTS

| | | | |
|---|---|---|---|
| 5,732,174 | A | 3/1998 | Carpenter et al. |
| 6,431,763 | B1 * | 8/2002 | Sherman et al. ................ 385/81 |
| 6,450,697 | B1 | 9/2002 | Ngo |
| 6,607,308 | B2 | 8/2003 | Dair et al. |
| 6,743,061 | B2 * | 6/2004 | Jaegerskuepper ............ 439/834 |
| 7,597,485 | B2 * | 10/2009 | Moriarty et al. ................ 385/89 |
| 7,905,665 | B2 * | 3/2011 | Moriarty et al. ................ 385/89 |
| 7,927,023 | B2 * | 4/2011 | Moriarty et al. ................ 385/53 |
| 2011/0206328 | A1 | 8/2011 | Wang |

FOREIGN PATENT DOCUMENTS

| | | |
|---|---|---|
| EP | 2161602 | 3/2012 |
| WO | WO-2010022504 | 3/2010 |

OTHER PUBLICATIONS

"Analog OptoLock FC300T 650 nm Analog Fiber Optic Transceiver With Termination for Bare POF", Data Sheet [online] Firecomms, 2007 [retrieved on Jan. 12, 2012]. Retrieved from the Internet <URL: http://firecomms.com/downloads/datasheets/FC300T.pdf> 2007.
"Industrial High Speed Optical Transceiver IDL301T-220", Data sheet [Data sheet [online]. Firecomms [retrieved on Jan. 12, 2012]. Retrieved from the internet: <http://firecomms.com/downloads/datasheets/IDL301T_Data_Sheet.pdf>.

* cited by examiner

*Primary Examiner* — Sung Pak

(57) ABSTRACT

An optical module includes a housing, an actuator and a fiber clamp having at least one spring member. The actuator and housing are moveable in a sliding manner relative to one another such that the actuator can assume a first actuator position or a second actuator position relative to the housing. The spring member has a first portion in sliding contact with a ramped surface of the actuator and a second portion movable between a first clamp position and a second clamp position in response to sliding movement of the actuator between the first actuator position and second actuator position, respectively. Movement of the second portion of the spring member to the second clamp position reduces a dimension of a fiber passage in the module to frictionally engage an optical fiber in the fiber passage.

16 Claims, 6 Drawing Sheets

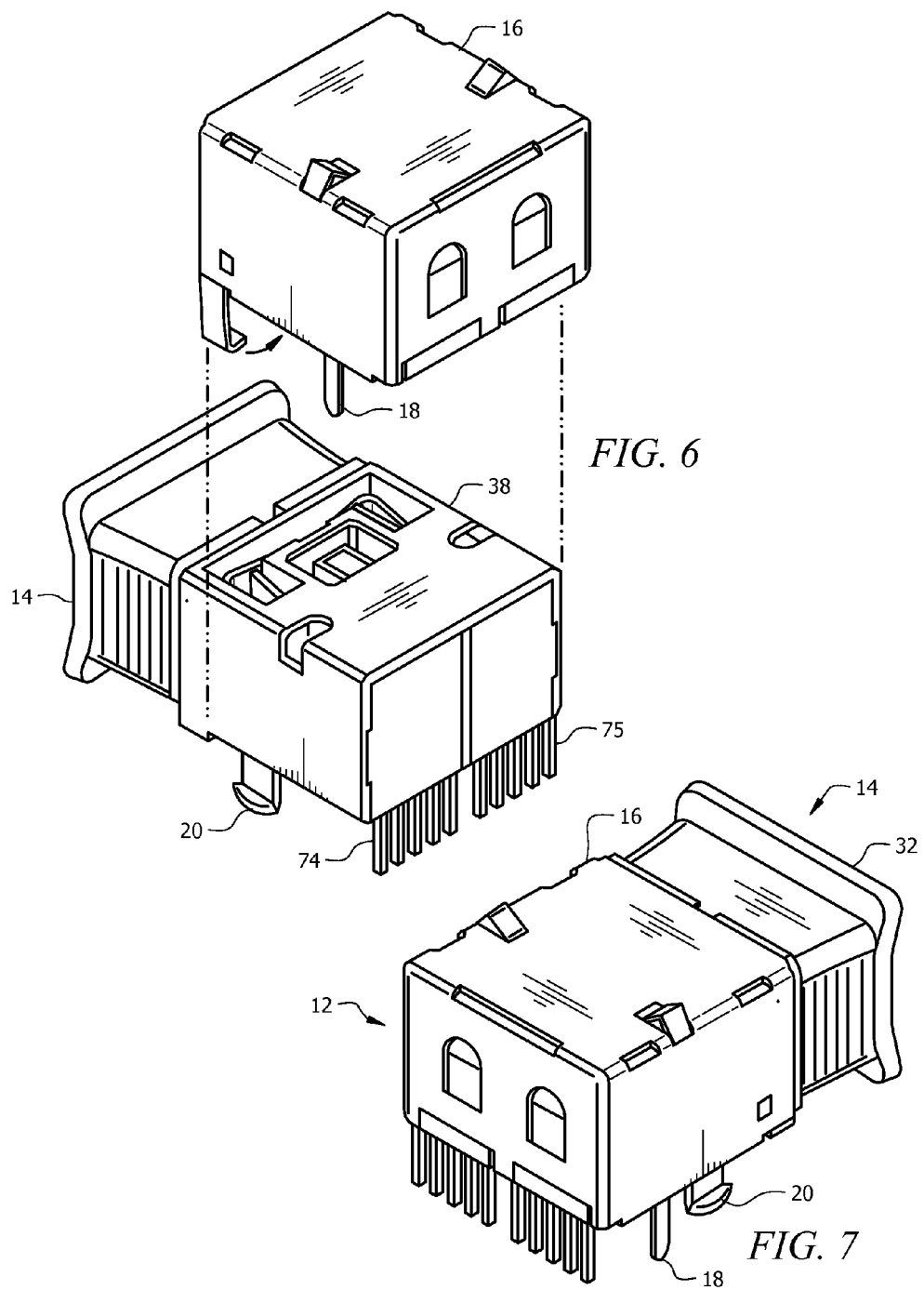

US 8,740,478 B2

OPTICAL MODULE WITH BARE FIBER CLAMP

BACKGROUND

In data communication systems, it is often useful to modularize interface electronics and other interface elements in a data communication module. For example, in an optical data communication system, an opto-electronic transceiver module may include a light source such as a laser, and a light receiver such as a photodiode. To use such an opto-electronic transceiver module, an optical fiber cable is coupled to a port in the module. Such a module also includes electrical contacts that can be coupled to an external electronic system.

In an instance in which the end of an optical fiber is terminated with a plug, the optical fiber can be coupled to an optical data communication module by plugging the plug into a receptacle on the module. In some instances, however, it is desirable to couple a bare fiber (i.e., a fiber not terminated with a plug) to an optical data communication module. Such modules commonly include a housing and an actuator. To couple a bare fiber, the actuator is moved to a first position relative to the housing. Then, the end of the fiber is inserted into a port in the module. The actuator is then moved to a second position relative to the housing. With the actuator in the second position, a portion of the actuator grips or otherwise engages the surface of the fiber end. Various actuator mechanisms for engaging the surface of the fiber end are known in such modules.

Problems with prior modules that engage the end of a bare optical fiber include poor electromagnetic interference (EMI) shielding of electronic elements within the housing and insufficient retention or clamping force to securely retain the fiber. It would be desirable to provide an improved bare fiber clamping optical module.

SUMMARY

Embodiments of the present invention relate to an optical module that includes a housing, an actuator, and a fiber clamp having at least one spring member. In an exemplary embodiment, the actuator has a portion slideably engageable with the housing. The actuator and housing are moveable in a sliding manner relative to one another such that the actuator can assume a first actuator position or a second actuator position relative to the housing. The actuator has a portion that includes a ramped surface. In the exemplary embodiment, the spring member of the fiber clamp has a first portion in sliding contact with the ramped surface of the actuator and a second portion movable between a first clamp position and a second clamp position in response to movement of the actuator between the first actuator position and second actuator position, respectively. Movement of the second portion of the spring member to the second clamp position reduces a dimension of a fiber passage in the optical module, thereby frictionally engaging an optical fiber in the fiber passage.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 6 is similar to FIG. 5, showing the assembly of the EMI shield to the remainder of the module.

FIG. 7 is a rear perspective view of the module of FIGS. 1-6.

DETAILED DESCRIPTION

Figure 1:
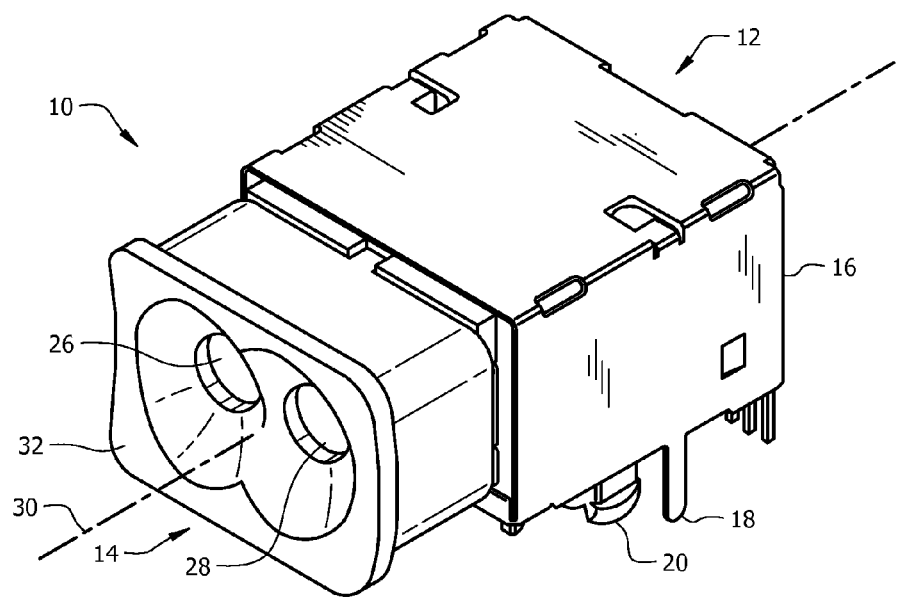
FIG. 1 is a perspective view of a bare fiber clamping optical module, in accordance with an exemplary embodiment of the invention.

As illustrated in FIG. 1, in an illustrative or exemplary embodiment of the invention, an optical data communication module 10 includes a housing 12 and an actuator 14. Housing 12 is enclosed in an electromagnetic interference (EMI) shield 16 (FIGS. 1 and 5-7). When optical data communication module 10 is mounted on a circuit board (not shown), terminals 18 extending from EMI shield 16 can be coupled to a ground potential on the circuit board to ground EMI shield 16. Housing 12 has protrusions 20 that can be inserted into holes in such a circuit board to mount optical data communication module 10 on the surface of the circuit board.

Figure 2:
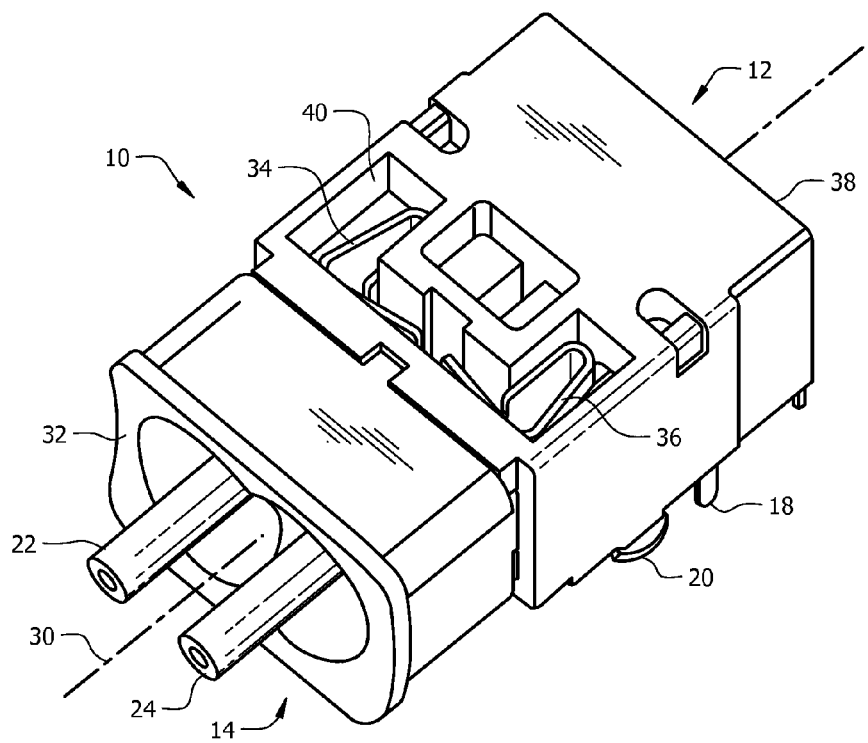
FIG. 2 is a perspective view similar to FIG. 1, with the EMI shield removed and with two optical fibers retained in the module.
Figure 3A:
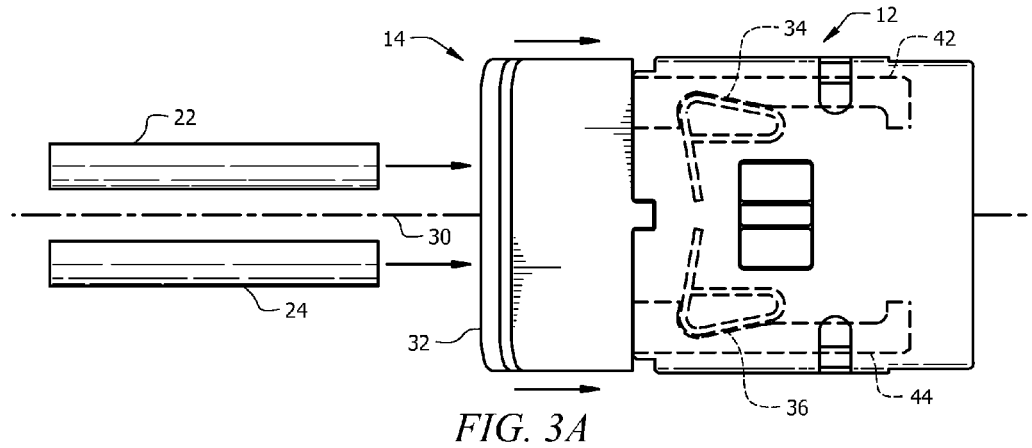
FIG. 3A is a top plan view of the module of FIGS. 1-2, prior to inserting the fibers.
Figure 3B:
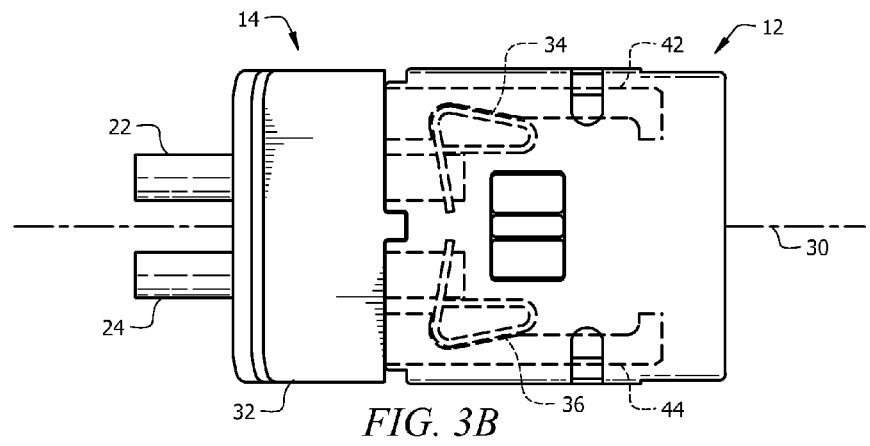
FIG. 3B is similar to FIG. 3A, showing the module in a clamped state after the fibers have been inserted and clamped.
Figure 3C:
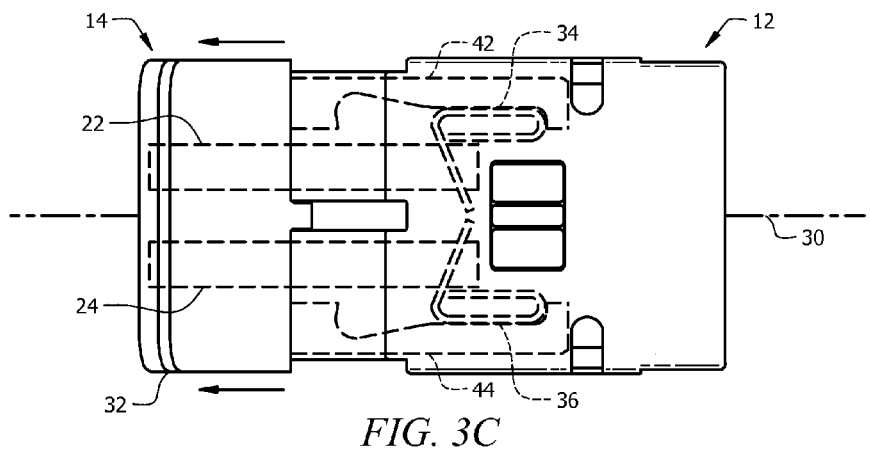
FIG. 3C is similar to FIGS. 3A-B, showing the module in an unclamped state.
Figure 4A:
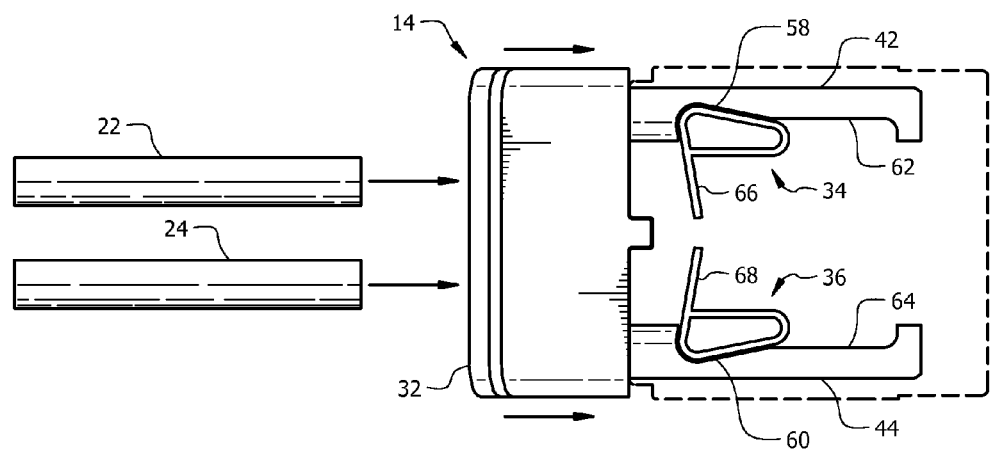
FIG. 4A is similar to FIG. 3A, but showing the actuator and spring members only.
Figure 4B:
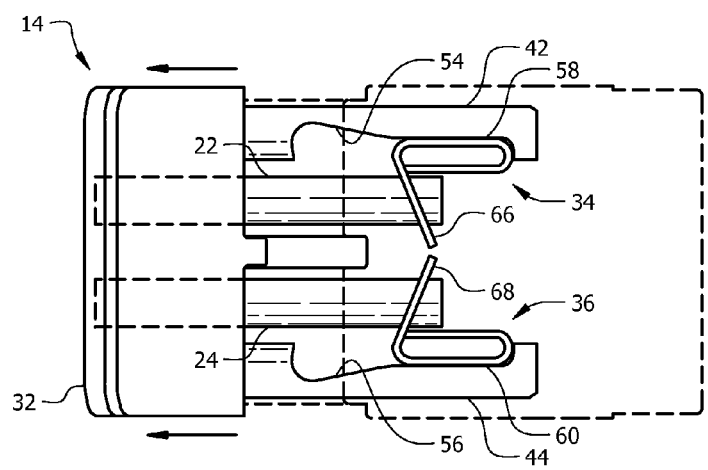
FIG. 4B is similar to FIG. 3C, but showing the actuator and spring members only.

In FIGS. 3C and 4B, optical data communication module 10 is shown in an "unclamped" state or state in which optical fibers 22 and 24 (FIGS. 2, 3A-B and 4A) can be freely inserted into or removed from optical data communication module 10, i.e., without optical fibers 22 and 24 being engaged or experiencing the frictional retention forces described below. Actuator 14 has two openings 26 and 28 (FIG. 1) for receiving the ends of such optical fibers 22 and 24, respectively, when optical data communication module 10 is in the unclamped state. Note that openings 26 and 28 are disposed symmetrically on either side of a central axis 30 (FIGS. 1-2) of optical data communication module 10.

After the ends of optical fibers 22 and 24 have been inserted into openings 26 and 28, a user can grip the front portion 32 of actuator 14 and push front portion 32 toward housing 12. Pushing actuator 14 and housing 12 together in this manner causes a portion of actuator 14 to retract into housing 12 in a sliding manner, as illustrated in FIGS. 3A, 3B and 4A. In FIGS. 1, 2, 3A, 3B, 4A, 6 and 7 optical data communication module 10 is shown in a "clamped" state or state in which optical fibers 22 and 24 cannot freely be inserted into or removed from optical data communication module 10 because optical data communication module 10 exerts a frictional clamping force that retains the ends of optical fibers 22 and 24 in optical data communication module 10. Optical data communication module 10 provides this clamping force in the following manner.

Figure 8:
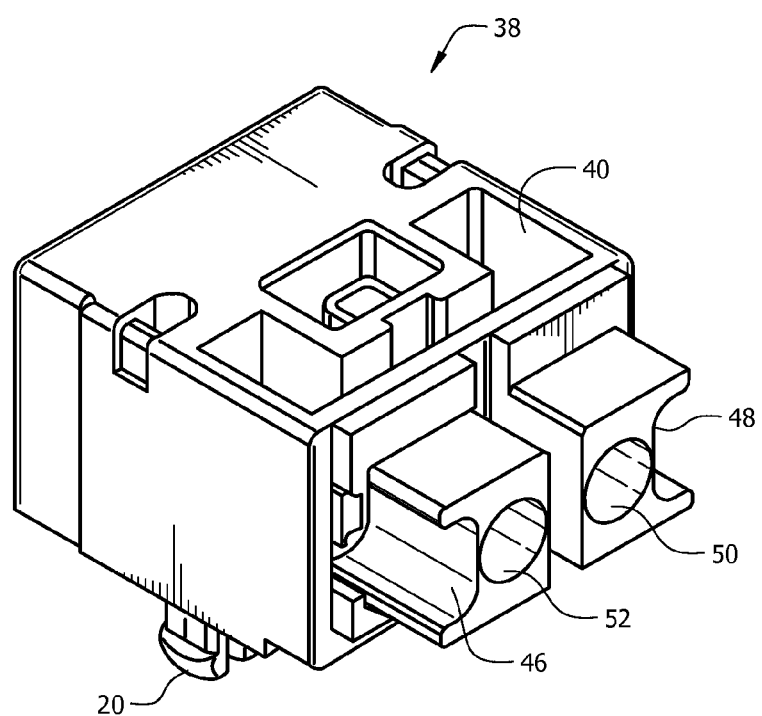
FIG. 8 is a front perspective view of the module of FIGS. 1-6, with the EMI shield and actuator removed.

As illustrated in FIGS. 2, 3A-C, 4A-B, 5 and 6, optical data communication module 10 further includes a fiber clamp comprising two spring members 34 and 36. Spring members 34 and 36 are retained within a recess 40 (FIGS. 2, 5 and 8) in a body 38 of housing 12. Actuator 14 includes two arms 42 and 44 (FIGS. 3-5) that extend perpendicularly from front portion 32, thus forming a U-shape. Arms 42 and 44 engage and slide within grooves 46 and 48 (FIG. 8), respectively, in body 38, thus enabling actuator 14 to extend and retract relative to housing 12 in the manner described above. Body 38 has ports 50 and 52 (FIGS. 5 and 8) extending through it to accommodate fibers 22 and 24, respectively. Ports 50 and 52 of housing 12 are axially aligned (i.e., along an axis parallel to central axis 30) with openings 26 and 28 in actuator 14. The combination of respective ports 50 and 52 and openings 26 and 28 and any other similarly axially aligned regions in optical data communication module 10 define two fiber passages for accommodating portions of fibers 22 and 24, respectively, or the optical signals coupled thereto.

Figure 5:
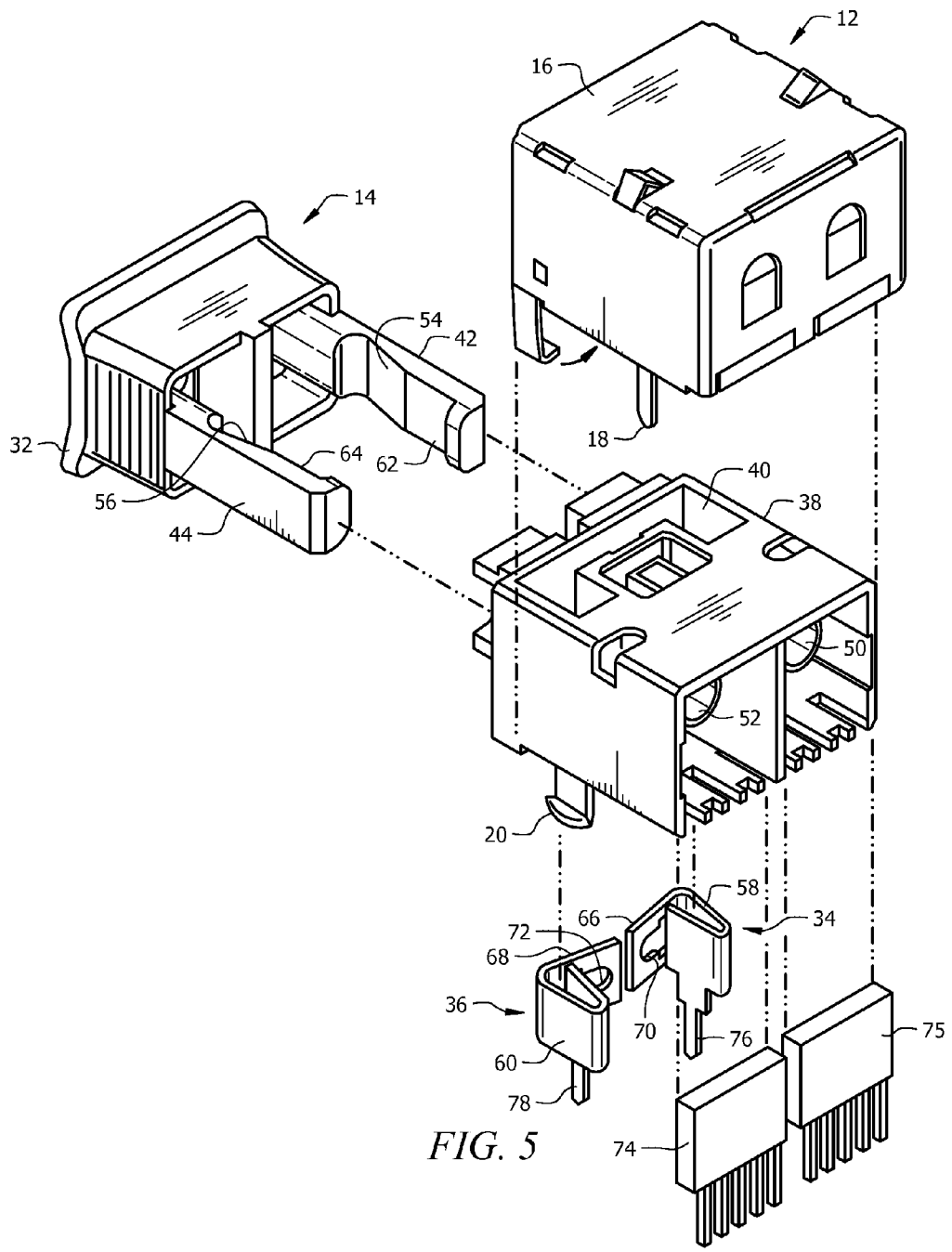
FIG. 5 is an exploded view of the module of FIGS. 1-4.

As illustrated in FIGS. 4A-B and 5, arms 42 and 44 have ramped surfaces 54 and 56 (FIGS. 4B and 5), respectively. "Ramped" in this context means oriented at a non-zero angle with respect to central axis 30 and thus similarly angled with respect to the ends of fibers 22 and 24 inside housing 12. A first portion 58 of spring member 34 slides against ramped surface 54. Likewise, a first portion 60 of spring member 36 slides against ramped surface 56.

When optical data communication module 10 is placed in the unclamped state or position by extending actuator 14 in the manner described above, first portions 58 and 60 rest against flat surfaces (i.e., parallel to central axis 30) 62 and 64 (FIGS. 4A and 5) adjacent to ramped surfaces 56 and 58, respectively. In this state, since flat surfaces 62 and 64 are closer to their respective fibers than ramped surfaces 54 and 56, flat surfaces 62 and 64 displace first portions 58 and 60. First portions 58 and 60 flex resiliently because they are made of sheet metal or similar resilient or spring-like material. In this flexed or displaced state, first portions 58 and 60 exert a resilient bias force against flat surfaces 62 and 64.

As illustrated in FIGS. 4A-B and 5, spring members 34 and 36 have second portions 66 and 68, respectively. First portions 58 and 60 and second portions 66 and 68, respectively, are unitarily formed with each other in the exemplary embodiment. For example, first portion 58 and second portion 66 may define legs of a single strip of sheet metal formed by bending the strip at an angle where first and second portions 58 and 66 adjoin. Likewise, first portion 60 and second portion 68 may define legs of a single strip of sheet metal formed by bending the strip at an angle where first and second portions 60 and 68 adjoin.

As illustrated in FIG. 5, second portion 66 of spring member 34 has an opening 70, and second portion 68 of spring member 36 has an opening 72. When optical data communication module 10 is in the unclamped state, the above-described displacement or movement of first portions 58 and 60 moves second portions 66 and 68 to the state shown in FIG. 4B. In this first "clamp state" or unclamped state, each opening 70 and 72 is aligned with the remainder of the respective fiber passage within optical data communication module 10. That is, no portion of the peripheral walls of openings 70 and 72 are interposed within the fiber passages in a manner that would decrease the diameters of the fiber passages and thus impede withdrawal or insertion of fibers 22 and 24. Note that the diameters of the fiber passages and their constituent elements (e.g., openings 26 and 28 in actuator 14 and ports 50 and 52 in body 38) are substantially equal to (or just slightly larger than) the diameter of an average or common optical fiber, so as to guide the ends of fibers 22 and 24 within optical data communication module 10.

When optical data communication module 10 is placed in the clamped state by retracting actuator 14 in the manner described above, first portions 58 and 60 slide against ramped surfaces 54 and 56, respectively, to reach the state or position shown in which they are shown in FIGS. 3B and 4A. In this state, since ramped surfaces 54 and 56 are farther from their respective fibers than flat surfaces 62 and 64, first portions 58 and 60 have room to resiliently relax, thus reducing the above-described displacement. In this unflexed state, first portions 58 and 60 are relaxed (in the sense of a spring), i.e., they do not exert a resilient bias force. Note that the relaxation of spring members 34 and 36 in this manner also aids retracting actuator 14. When a user grips front portion 32 of actuator 14 and begins pushing it toward housing 12, the spring force generated by the relaxation of spring members 34 and 36 helps snap actuator 14 into the retracted position shown in FIGS. 1, 2, 3A, 3B, 4A, 6 and 7 and retain actuator 14 in that position. With actuator 14 in this retracted position, optical data communication module 10 is in a clamped state.

When optical data communication module 10 is in the clamped state, the above-described displacement or movement of first portions 58 and 60 moves the adjoining second portions 66 and 68 to the positions shown in FIG. 4A. In this second (clamped) clamp state, openings 70 and 72 are slightly offset from the remainder of the fiber passage within optical data communication module 10. That is, portions of the peripheries or internal walls of openings 70 and 72 are interposed within the fiber passages in a manner that decreases their diameters. Since the fiber passages have diameters substantially equal to the diameters of optical fibers 22 and 24, portions of the fiber passages frictionally engage optical fibers 22 and 24. More specifically, the portions of the peripheries or internal walls of openings 70 and 72 in spring members 34 and 36, respectively, contact the surfaces of optical fibers 22 and 24 and thus frictionally engage them. When engaged in this manner, optical fibers 22 and 24 cannot freely be removed from optical data communication module 10. That is, optical data communication module 10 clamps optical fibers 22 and 24.

Although in the exemplary embodiment, the peripheries or internal walls of openings 70 and 72 become interposed within the respective fiber passages and thereby reduce the diameters of the fiber passages, in other embodiments similar spring members can have any other suitable portions that can reduce a dimension of a fiber passage in a manner that frictionally engages an optical fiber with the passage.

It should be noted that because second portions 66 and 68 of spring members 34 and 36, respectively, extend in a plane that is substantially perpendicular to central axis 30, second portions 66 and 68 serve as a wall-like barrier that helps block EMI against entry into the interior of housing 12. Note that because optical fibers 22 and 24 fit snugly within openings 70 and 72, respectively, EMI emanating from a direction generally along central axis 30 cannot readily penetrate past the wall-like structure defined by second portions 66 and 68. Spring members 34 and 36 include terminals 76 and 78 (FIG. 5), respectively, which can be coupled to a ground potential on the circuit board. The grounded EMI shield 16 only provides EMI shielding on five sides of optical data communication module 10, as the five-walled box-like EMI shield 16 is open on its front side (i.e., there is no wall on the front side of EMI shield 16). The grounded second portions 66 and 68 thus further provide EMI shielding on the front side of optical data communication module 10, where EMI shield 16 is open. But for such EMI shielding, EMI could penetrate housing 12 and hamper the operation of an opto-electronic receiver device 74 and an opto-electronic transmitter device 75 that are mounted within housing 12 as shown in FIGS. 5-7.

Opto-electronic transmitter device 75, which can include a laser diode or similar source of optical data signals, is optically aligned with port 50 and thus with the fiber passage in which the end of optical fiber 22 is received. Opto-electronic transmitter device 75 converts electrical signals into optical signals, which are emitted into the fiber passage and thus into the end of optical fiber 22 clamped therein. Opto-electronic transmitter device 75 receives these electrical signals from the circuit board (not shown) on which optical data communication module 10 is mounted. Similarly, opto-electronic receiver device 74, which can include a photodiode or similar optical data signal detector, is optically aligned with port 52 and thus with the fiber passage in which the end of optical fiber 24 is received. Opto-electronic receiver device 74 converts optical signals that it receives from the end of optical fiber 24 clamped in its associated fiber passage into electrical signals. Opto-electronic receiver device 74 provides these electrical signals to the circuit board (not shown) on which optical data communication module 10 is mounted.

One or more illustrative embodiments of the invention have been described above. However, it is to be understood that the invention is defined by the appended claims and is not limited to the specific embodiments described.

What is claimed is:

1. An optical module, comprising:
a housing having a first port for receiving a first optical fiber;
an actuator having a portion slideably engageable with the housing and having a ramped surface, the actuator slideably movable relative to the housing between a first actuator position and a second actuator position;
a fiber clamp comprising a first spring member, the first spring member having a first portion in sliding contact with the ramped surface of the actuator and a second portion movable between a first clamp position and a second clamp position in response to sliding movement of the actuator between the first actuator position and the second actuator position, the second portion of the first spring member having a planar shape and being metallic and oriented perpendicular to a central axis of the housing to promote EMI shielding of an interior of the housing, the second portion of the first spring member having an opening with a dimension substantially equal to an optical fiber diameter, the opening defining a portion of the first fiber passage, and an internal wall of the opening in the second portion of the first spring member moving into contact with a first optical fiber within the first fiber passage to reduce the dimension of the first fiber passage and frictionally engage the first optical fiber in response to the second portion of the first spring member moving from the first clamp position to the second clamp position.

2. The optical module of claim 1, wherein the first fiber passage is parallel to a central axis of the housing, and the actuator and housing are slideable with respect to each other along a direction parallel to the central axis.

3. The optical module of claim 1, wherein the actuator has an opening aligned with the first port of the housing.

4. The optical module of claim 1, wherein the first spring member is resiliently biased against the ramped surface of the actuator when the actuator is in the second actuator position and is resiliently relaxed with respect to the ramped surface of the actuator when the actuator is in the first actuator position.

5. The optical module of claim 1, wherein:
the housing further comprises a second port; and
the fiber clamp further comprises a second spring member substantially identical to the first spring member, the first and second spring members disposed symmetrically with respect to each other and with respect to a central axis of the housing parallel to the first and second ports of the housing.

6. The optical module of claim 1, wherein the first and second portions of the first spring member are unitarily formed in substantially planar metal and extend from a common junction to define an oblique angle therebetween.

7. The optical module of claim 6, wherein the second portion of the first spring member has an opening having a diameter substantially equal to an optical fiber diameter, the opening defining a portion of the first fiber passage.

8. The optical module of claim 1, wherein:
the housing further comprises a second port; and
the fiber clamp comprises a first spring member and a second spring member, the actuator has a U-shape defined by a front portion, a first arm extending perpendicularly from the front portion, and a second arm extending perpendicularly from the front portion, and wherein the first arm has a ramped surface in sliding contact with the first portion of the first spring member, the second arm has another ramped surface in sliding contact with the first portion of the second spring member, and the front portion has two openings respectively aligned with the first and second ports of the housing for receiving respective optical fibers.

9. The optical module of claim 8, wherein:
the first and second spring portions are substantially identical to each other and symmetrically disposed with respect to a central axis of the housing;
the second portion of the first spring member has an opening having a dimension substantially equal to an optical fiber diameter, the opening in the first spring member defining a portion of the first fiber passage, and an internal wall of the opening in the first spring member moving into contact with the first fiber to reduce the dimension of the passage when the second portion of the first spring member moves from the first clamp position to the second clamp position; and
a second portion of the second spring member has an opening having a dimension substantially equal to an optical fiber diameter, an opening in the second spring member defining a portion of a second fiber passage, and an internal wall of the opening in the second spring member moving into contact with a second fiber to reduce the dimension of the second fiber passage when the second portion of the second spring member moves from the first clamp position to the second clamp position.

10. A method for retaining at least one optical fiber in an optical module mounted on a circuit board, the optical module including a fiber clamp comprising a metallic first spring member coupled to an electrical ground conductor of the circuit board and having a second portion with a planar shape and oriented perpendicular to a central axis of the housing to promote EMI shielding of an interior of the housing, comprising:
coupling the first spring member to an electrical ground conductor of the circuit board
moving an actuator to a first actuator position relative to the housing, the actuator having a portion sliding with respect to the housing, a ramped surface of the actuator sliding against a ramped surface of the first spring member, the second portion of the first spring member moving to a first clamp position in response to the actuator sliding against the ramped surface of a first spring member;

inserting a first optical fiber into the optical module while the actuator is in the first actuator position, a portion of the optical fiber extending into an opening in the second portion of the first spring member defining a first fiber passage, the opening having a dimension substantially equal to a diameter of the first optical fiber;

moving the actuator from the first position to a second position relative to the housing, the second portion of the first spring member moving from the first clamp position to a second clamp position in response to the actuator sliding against the ramped surface of a first spring member, movement of the second portion of the first spring member to the second clamp position reducing a dimension of the first fiber passage to frictionally engage the first optical fiber within the first fiber passage, an internal wall of the opening in the second portion of the first spring member moving into contact with the first optical fiber to reduce the dimension of the first fiber passage when the second portion of the first spring member moves from the first clamp position to the second clamp position.

11. The method of claim 10, wherein moving the actuator from the first position to a second position moves an internal wall of an opening in the first spring member into contact with the first optical fiber.

12. The method of claim 10, wherein moving the actuator from the first actuator position to the second actuator position urges the first spring member into resilient bias against the ramped surface of the actuator, and moving the actuator from the second actuator position to the first actuator position relaxes the first spring member out of resilient bias against the ramped surface of the actuator.

13. The method of claim 10, further comprising:
inserting a second optical fiber into the optical module while the actuator is in the first actuator position, a portion of the optical fiber extending into a second fiber passage; and
wherein moving the actuator from the first actuator position to a second actuator position relative to the housing moves a second portion of a second spring member substantially identical to the first spring member from the first clamp position to the second clamp position in response to the actuator sliding against a ramped surface of the second spring member, movement of the second portion of the second spring member to the second clamp position reducing a dimension of the second fiber passage to frictionally engage the second optical fiber within the second fiber passage.

14. The method of claim 10, wherein:
inserting a first optical fiber into the optical module comprises inserting the first optical fiber into a first opening in a front portion of the actuator;
inserting a second optical fiber into the optical module comprises inserting the second optical fiber into a second opening in the front portion of the actuator;
moving the actuator from the first actuator position to a second actuator position comprises gripping the front portion of the actuator, the actuator having a U-shape defined by the front portion, a first arm extending perpendicularly from the front portion, and a second arm extending perpendicularly from the front portion, wherein moving the actuator from the first actuator position to a second actuator position slides a ramped surface of the first arm against the first portion of the first spring member and slides another ramped surface of the second arm against the first portion of a second spring member substantially identical to the first sprint member.

15. An optical module, comprising:
a housing having a first port defining a portion of a first fiber passage and a second port defining a portion of a second fiber passage;
an actuator having a U-shape defined by a front portion having two openings respectively aligned with the first and second ports for respectively receiving a first optical fiber and a second optical fiber, a first arm extending perpendicularly from the front portion, and a second arm extending perpendicularly from the front portion, the first and second arms each having a ramped surface;
a first metallic spring member having a first portion in sliding contact with the ramped surface of the first arm and a second portion movable between a first clamp position and a second clamp position in response to sliding movement of the actuator relative to the housing, the second portion of the first metallic spring member being planar and having an opening having a dimension substantially equal to an optical fiber diameter, the opening in the first metallic spring member defining another portion of the first fiber passage, and an internal wall of the opening in the first metallic spring member moving into contact with the first optical fiber to reduce a dimension of the first fiber passage in response to the second portion of the first metallic spring member moving from the first clamp position to the second clamp position; and
a second metallic spring member having a first portion in sliding contact with the ramped surface of the first arm and a second portion movable between the first clamp position and the second clamp position in response to sliding movement of the actuator relative to the housing, the second portion of the second metallic spring member being planar and having an opening having a dimension substantially equal to an optical fiber diameter, the opening in the second metallic spring member defining another portion of the second fiber passage, and an internal wall of the opening in the second metallic spring member moving into contact with the second optical fiber to reduce a dimension of the second fiber passage in response to the second portion of the second metallic spring member moving from the first clamp position to the second clamp position.

16. The optical module of claim 15, wherein:
the first spring member is resiliently biased against the ramped surface of the first arm when the actuator is in the second actuator position and is resiliently relaxed with respect to the ramped surface of the first arm when the actuator is in the first actuator position; and
the second spring member is resiliently biased against the ramped surface of the second arm when the actuator is in the second actuator position and is resiliently relaxed with respect to the ramped surface of the second arm when the actuator is in the first actuator position.

* * * * *